(12) United States Patent
Hausenbauer

(10) Patent No.: US 6,231,268 B1
(45) Date of Patent: May 15, 2001

(54) APPARATUS AND METHOD FOR TREATMENT OF LARGE WATER BODIES BY DIRECTED CIRCULATION

(75) Inventor: Thomas Charles Hausenbauer, St. Peter, MN (US)

(73) Assignee: Limnetics Corporation, St. Peter, MN (US)

( * ) Notice: Subject to any disclaimer, the term of this patent is extended or adjusted under 35 U.S.C. 154(b) by 0 days.

(21) Appl. No.: 09/293,897

(22) Filed: Apr. 19, 1999

(51) Int. Cl.[7] ............................. E02B 15/02; B01F 7/00
(52) U.S. Cl. ......................... 405/61; 366/285; 366/330.1
(58) Field of Search ........................... 119/232; 366/102, 366/285, 314, 330.1, 331, 349; 405/52, 61

(56) References Cited

U.S. PATENT DOCUMENTS

| | | | |
|---|---|---|---|
| 2,991,622 | * | 7/1961 | Oster ........................................ 405/61 |
| 3,083,538 | * | 4/1963 | Gross ........................................ 405/61 |
| 3,109,288 | * | 11/1963 | Gross ........................................ 405/61 |
| 3,865,909 | * | 2/1975 | Cramer, Jr. ............................... 261/91 |
| 4,594,006 | * | 6/1986 | Depeault ................................. 366/266 |
| 4,764,313 | * | 8/1988 | Cameron et al. ....................... 261/35 |
| 4,774,631 | * | 9/1988 | Schurz ..................................... 261/87 |
| 5,338,116 | * | 8/1994 | Sporl ....................................... 366/286 |

FOREIGN PATENT DOCUMENTS

3941724 A1 * 6/1991 (DE) .

* cited by examiner

*Primary Examiner*—David Bagnell
*Assistant Examiner*—Jennifer M Hawkins

(57) ABSTRACT

Apparatus and method for inducing directed water movements for treatment of large water bodies subject to surface freezing, stagnation, bottom oxygen deficiency, or other non-uniform conditions. The apparatus consists of an open axial-flow impeller, driven by a motor, supported from below by a streamlined structure, totally submerged in a water body to avoid proximity to the surface, and resting on the bottom of the water body. The rotation of the impeller produces a water movement directed as aimed. A method is disclosed whereby dissolved oxygen is renewed in ice-bound water bodies by raising warm bottom water to melt surface ice, thereby creating an area of open water exposed to direct atmospheric oxygen diffusion and photosynthesis, and simultaneously circulating oxygen enriched water to remote parts of the water body. A further method is disclosed whereby induced circulation facilitates control of vegetation, nutrients, odors, scum, and aerobic habitat in water bodies that are stratified or otherwise have non-uniform water quality.

10 Claims, 9 Drawing Sheets

APPARATUS AND METHOD FOR TREATMENT OF LARGE WATER BODIES BY DIRECTED CIRCULATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

This invention relates to treatment of large water bodies by circulation. More particularly, this invention relates to means of improving water quality in a surface-frozen, stratified, or otherwise non-uniform water bodies.

Circulation devices are utilized in lakes, ponds, wastewater basins, and other large water bodies for a number of purposes which benefit the public health, recreational and aesthetic value of the water body, as well as downstream waters.

Circulation is useful for prevention of winter kill of fish. Fish in water bodies in cold climates are subject to suffocation when ice and/or ice and snow cover prevents renewal of the dissolved oxygen supply. Dissolved oxygen renewal typically occurs by two means: (1.) direct diffusion from the atmosphere to the exposed open water surface, and (2.) photosynthesis by living plants, using sunlight entering either through the exposed open water surface or through relatively clear ice with little or no snow cover. The invention facilitates this oxygen transfer process by two means: (1.) By bringing warmer, denser bottom water vertically up to the surface, melting ice or ice/snow cover on the surface to create an area of open water in the proximity of the device, exposing water directly to the atmosphere to allow oxygen renewal by direct diffusion and photosynthesis; and (2) By horizontally and vertically circulating to continually distribute oxygen-rich water from the open water area to remote parts of the water body, and replace said oxygen-rich water with oxygen-poor water from remote parts of the water body. Said oxygen-poor water is able to absorb more oxygen than would continuously re-circulated oxygen-rich water, increasing efficiency of oxygen transfer. Horizontal circulation also transports the oxygen-rich water to remote parts of the water body, increasing the overall benefit.

Circulation is used as a means of controlling or reversing stratification. In summer, water bodies, if sufficiently deep, tend to separate into a warmer upper layer known as the epilimnion, a cooler lower layer known as the hypolimnion, and an intermediate transition zone known as the metalimnion. That point in the metalimnion with the steepest thermal gradient is known as the thermocline. The high temperature gradient of the thermocline acts as a barrier against mixing of the hypolimnion and epilimnion. The depth of the epilimnion is thus also called the mixed depth. Vertical circulation through the metalimnion increases the mixed depth and reduces the size of the hypolimnion. If sufficient mixing is provided, stratification can be totally prevented or eliminated. Circulation for partial or complete de-stratification is practiced toward several useful purposes.

Increasing mixed depth through circulation is a means of controlling algae by limiting the amount of light available for photosynthesis at the deeper depths.

Increasing mixed depth through circulation is utilized to increase the size of aerobic habitat. In highly fertile or eutrophic water bodies, decaying dead algae from the epilimnion sinks into the dark hypolimnion, consuming oxygen as it decomposes. Oxygen demand in the lower strata exceeds supply due to (1.) high oxygen demand from settling of dead algae and other organic solids, combined with (2) lack of atmospheric contact for direct diffusion, and lack of light for photosynthesis. In time, the oxygen supply in the hypolimnion becomes depleted. Aerobic animals, including desirable species such as game fish and zooplankton, are forced to crowd into the epilimnion. Zooplankton populations are depleted as they lose their dark refuge, and become easy prey for small planktivorous fish. A deeper epilimnion resulting from circulation provides a larger range for desirable game fish. A deeper epilimnion also results in additional dark refuge for zooplankton, which eat excessive algae.

De-stratification by circulation is a means for prevention of hydrogen sulfide odors originating in the anoxic hypolimnion and sediment-water interface. When dissolved oxygen becomes essentially absent in the lower water strata and upper sediment, anaerobic bacterial action becomes dominant. Anaerobic bacterial action creates hydrogen sulfide gas, forming bubbles which float to the surface and are absorbed into the atmospheric air. Hydrogen sulfide gas produces an offensive odor which can be transmitted by winds over long distances from the water body. De-stratification and circulation of the water body inhibit anaerobic bacterial action by continually exchanging oxygen-depleted water in the lower strata with oxygen-renewed water from the upper strata, where atmospheric contact for direct oxygen diffusion and light for photosynthesis are present.

A poorly circulated water body tends to give a competitive advantage to the undesirable bluegreen algae (cyanophyceae) over the less offensive green algae (chlorophyceae) and diatoms (bicillariophyceae). This is due to two causes: (1) Greens and diatoms have higher sinking rates compared to the more buoyant blue-greens. By remaining closer to the surface, blue-greens have a higher exposure to the light necessary for photosynthesis. (2) Blue-greens have a greater capacity to photosynthesize at lower concentrations of carbon dioxide, a necessary nutrient. De-stratification and circulation of the water body shift the competitive advantage to the greens and diatoms in two ways: (1) Circulation keeps greens and diatoms in suspension close to the surface for a longer period of time, increasing light availability for photosynthesis. (2) De-stratification increases carbon dioxide concentration near the surface, favoring the greens and diatoms. Growth of algae depends on the availability of soluble reactive phosphorous. A major source is phosphorous released from organic sediment in the absence of oxygen. When de-stratification increases oxygen content at the sediment-water interface, release of soluble reactive phosphorous is inhibited and algae growth is reduced.

Circulation will reduce or eliminate stagnation of water bodies and its undesirable effects, including: (1) floating live surface vegetation such as filamentous algae species (spirogyra, cladophora, etc.) and duckweed; (2) floating dead surface vegetation, scum, and oils; (3) odors associated with floating decaying vegetation, and (4) insect reproduction.

Circulation is also a means to facilitate mixing of desirable additives. For example, phosphorous-rich water may be mixed with an agent such as aluminum or iron salts, which combine with soluble reactive phosphorous to form a precipitate which settles to the bottom. Circulation can also distribute algaecides, lime for neutralization of acid rain, or other chemical agents.

Certain water bodies, particularly treated wastewater effluents, are high in nitrate. Circulation in the absence of oxygen facilitates de-nitrification, the process by which nitrate is reduced to molecular nitrogen by facultative anaerobic bacteria.

De-stratification and circulation devices presently in use generally are of one of several types. One class of devices is fountains driven by impeller pumps, such as shown in U.S. Pat. No. 3,865,909 (Cramer). Fountains pump water from below the surface and spray into the air, usually in a circular pattern. A disadvantage of fountains is that discharged water tends to re-circulate back through the fountain, so that only a small area is circulated, with little or no effect on remote parts of the water body. A further disadvantage of fountains is high energy consumption, as excessive kinetic energy is concentrated in a small volume of water. A further disadvantage of fountains is that they are exposed to inclement weather, and can be damaged by high waves, floating ice masses, ice formation, and temperature extremes. A further disadvantage of fountains is that they are a hazard to navigation.

De-stratification and circulation is also achieved by air bubblers, whereby a compressor pumps air through a pipe or hose to be released below the water surface, either directly or through a diffusion device. Bubbles are formed, creating a buoyant air-water mixture which rises to the surface. A disadvantage of air bubblers is that water tends to re-circulate back through the air bubblers, so that only a small area is circulated, with little or no effect on remote parts of the water body. A further disadvantage of air bubblers is high energy consumption, as overall circulation efficiency of an air-lift device is poor. A further disadvantage of air bubblers is the tendency of air pipes or hoses to float to the surface, where they may be subject to damage by ice or boats. A further disadvantage of air bubblers is that air lines and diffusion devices can leak or become clogged by ice or debris.

De-stratification and circulation is also achieved by surface propeller or paddle wheel devices, whereby an impeller, driven by a prime mover, is suspended at the water surface from a float or support structure. Many embodiments are known. The impeller is aimed and rotated to produce circulation in a desired direction. Some embodiments, such as shown in U.S. Pat. No. 4,774,031, are used with air injection, whereby bubbles aid the circulation by creating a buoyant air-water mixture which rises to the surface. In another embodiment, illustrated by U.S. Pat. No. 4,764,313, an impeller is driven by a vertical axis wind turbine, all on an anchored floating structure. A disadvantage of surface propeller or paddle devices is that their influence is limited to waters near the surface. A further disadvantage of surface propeller or paddle wheel devices is that they are exposed to inclement weather, and can be damaged by high waves, floating ice masses, ice formation, and temperature extremes. A further disadvantage of surface propeller or paddle wheel devices is that they are a hazard to navigation.

De-stratification and circulation is also achieved by surface-retrievable submersible propeller devices. One embodiment is illustrated by U.S. Pat. No. 5,338,116 (Spurl). Circulation is produced by a propeller rotated by a submersible electric motor, and the device is supported by a track structure which protrudes up through the water surface, enabling the device to be raised to the surface for service or replacement. A disadvantage of surface-retrievable submersible propeller devices is that their structure which protrudes the surface is exposed to inclement weather, and can be damaged by high waves, floating ice masses, ice formation, and temperature extremes. A further disadvantage of surface-retrievable submersible propeller devices is that stationary surface-penetrating support tracks or cables tend to collect floating debris such as dead weeds, rags, and plastic bags. A further disadvantage of surface-retrievable submersible propeller devices is that their structure which protrudes the surface is a hazard to navigation.

In summary, known apparatuses are limited in application due to: (1.) Limitation of the horizontal and vertical range of influence; (2.) High energy consumption; (3.) Susceptibility to damage or destruction due to natural elements such as high waves, wind, floating ice masses, ice formation, and temperature extremes; (4) Susceptibility to damage or destruction from human activities such as vandalism; (4) Susceptibility to collect floating debris; and (5.) Navigational hazard.

BRIEF SUMMARY OF THE INVENTION

The object of the invention is to circulate water with an energy efficient device capable of being placed on the bottom of a water body, not susceptible to natural elements, vandalism, navigational interference, or collection of floating debris, retrievable by a means not normally protruding through the surface of the water body, capable of being aimed and directed to produce the desired components of horizontal and vertical flow.

The apparatus of the invention consists of an open axial-flow impeller, driven by a motor, supported from below by a streamlined structure, totally submerged in a water body to avoid proximity to the surface, and resting on the bottom of the water body. The rotation of the impeller produces a water movement directed as aimed. The invention includes a method whereby dissolved oxygen is renewed in ice-bound water bodies by raising warm bottom water to melt surface ice, thereby creating an area of open water exposed to direct atmospheric oxygen diffusion and photosynthesis, and simultaneously circulating oxygen enriched water to remote parts of the water body. The invention includes a further method whereby induced circulation facilitates control of vegetation, nutrients, odors, scum, and aerobic habitat in water bodies that are stratified or otherwise have non-uniform water quality.

DETAILED DESCRIPTION OF THE DRAWINGS

Figure 1:
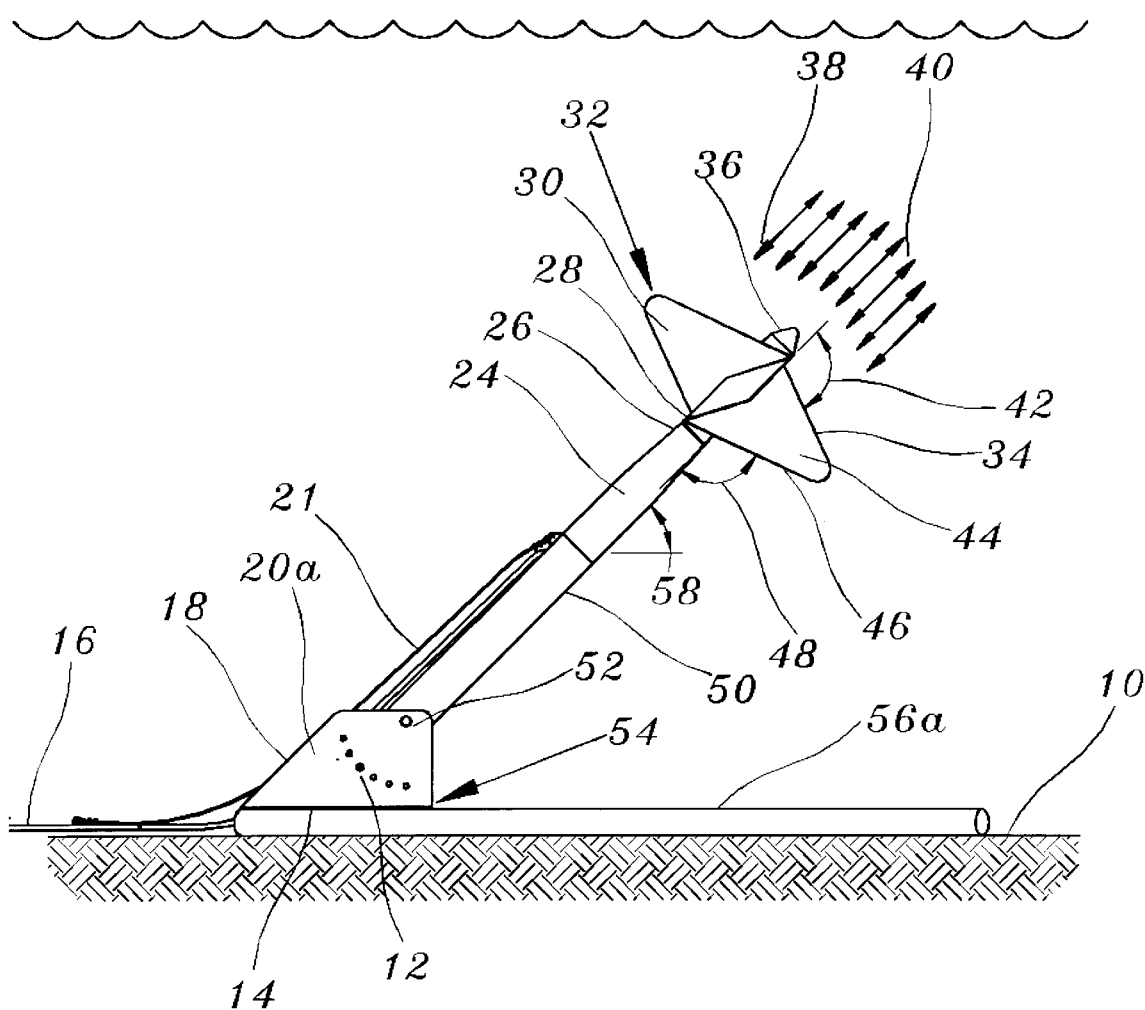
FIG. 1 is a side elevation view of a preferred embodiment of the complete device.
Figure 2:
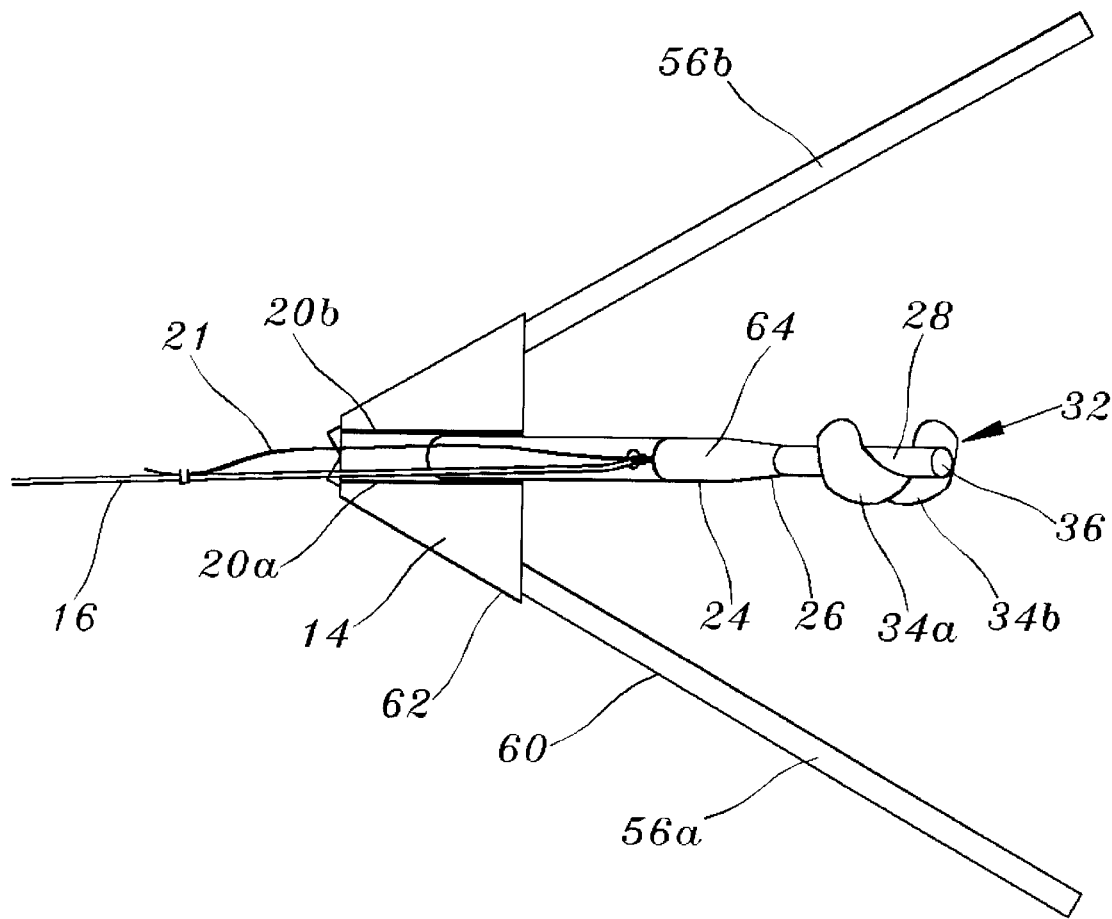
FIG. 2 is a top view of said embodiment.

A preferred embodiment of the device is depicted in FIGS. 1 and 2. The base 54, resting on the bottom of the water body 10, consists of two pipes 56a and 56b, with centerlines forming two sides of a triangle, connected at their apex to a horizontal mounting plate 14. Pipes 56a and 56b are optionally filled with concrete or other weight. Two vertical mounting plates 20a and 20b are welded or otherwise connected to horizontal mounting plate 14.

The first end of a support bar 50 rises from the apex of base 54, inclined on pivot pin 52, to the desired elevation angle setting 58, and constrained to vertical mounting plates 20a and 20b by locking bolt 12. Connected to the second end of support bar 50 is submersible motor unit 24, which includes integral speed reducer with sealed output shaft (not shown) at upper end 26, and streamlined housing.

A propeller 32 is detachably mounted to said sealed output shaft of submersible motor unit 24. Propeller 32 consists of a cylindrical hub 28, a streamlined nose cone 36 at the upper end of hub 28, and a plurality of propeller blades attached to hub 28 by welding or similar means. Upper surfaces 44 and lower surfaces 30 of said propeller blades are formed into a generally helical shape. When submersible motor unit 24 is rotated, sealed output shaft (not shown) drives propeller 32, forcing upward flow as depicted by the arrows 40 of the surrounding water generally parallel to the rotational axis of the hub 28. Optionally, the direction of rotation may be reversed to produce a downward water flow as depicted by the arrows 38. Said flow results in a water current in the direction established by the orientation of base 54, the elevation angle setting 58, and the direction of rotation of propeller 32.

Wherever practical, elements of the device are streamlined to reduce resistance to water flow, to eliminate snags or stagnant zones, and to minimize concave leading edges and other surfaces that collect debris. This is particularly beneficial when liquid flow is from bottom to top, whereby sunken weeds or debris may be swept into the device and become snagged or trapped. Leading edges such as 18, 46, and 62, and leading surfaces such as 30, 60, and 64 are sloped to minimize their angle with the direction of flow. Upper edge 34 and lower edge 46 of propeller blades are skewed to a taper angles 42 and 48 respectively, each greater than 90 degrees.

An electrical power cord 16 is attached at its first end (not shown) to an electric power source on shore, rests on the bottom 10 of the water body, and connects at its second end to the submersible motor unit 24.

Figure 3A:
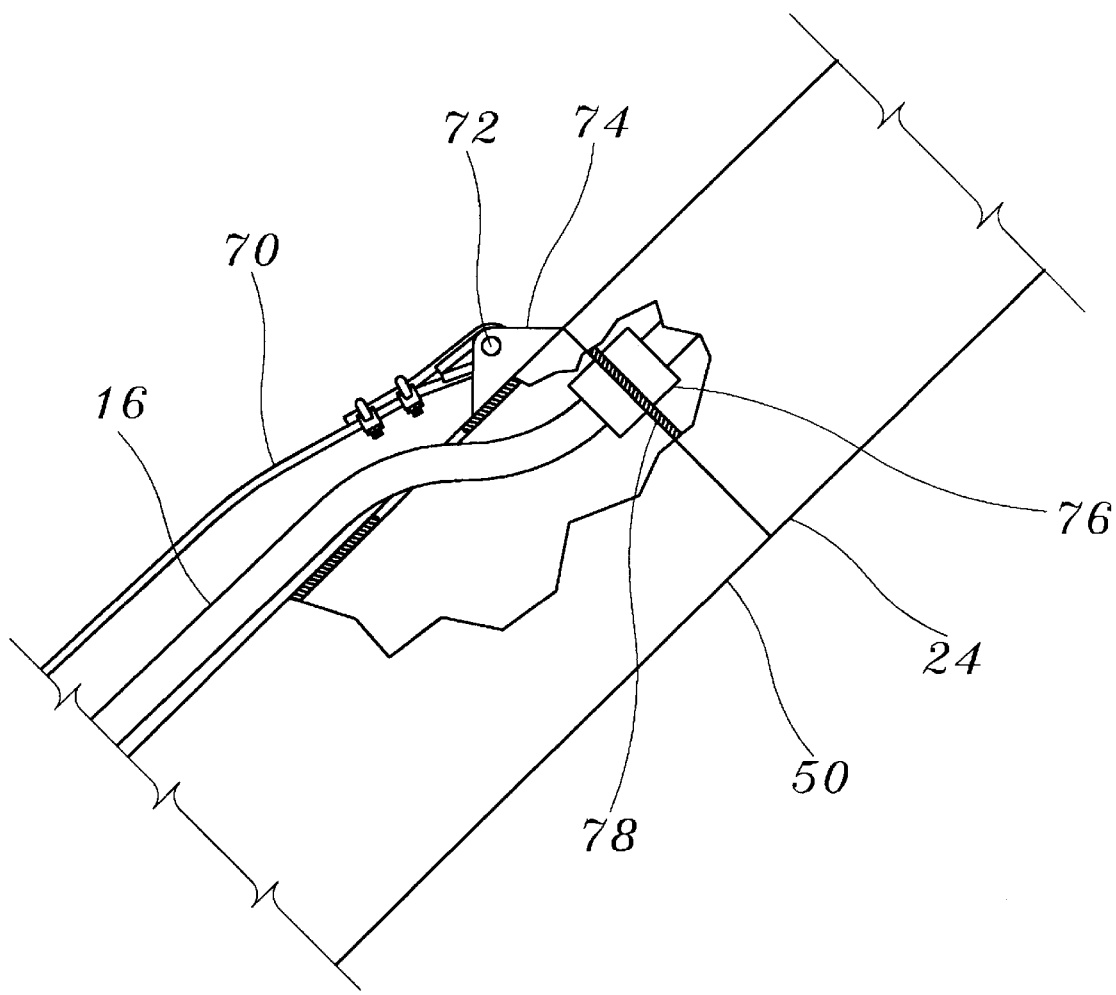
FIG. 3a shows attachment of the tether cable to the device.

FIG. 3a shows attachment of the tether cable to the device. Second end 70 is looped around and fastened to pin 72. Pin 72 fastens to the device through clevis 74, located generally above the center of gravity of the complete device. Electrical power cord 16 passes through the wall of support bar 50 through an opening located close to clevis 74. Electrical power cord 16 then passes through sealed bushing 76 in bulkhead 78, and into submersible motor unit 24.

Figure 3B:
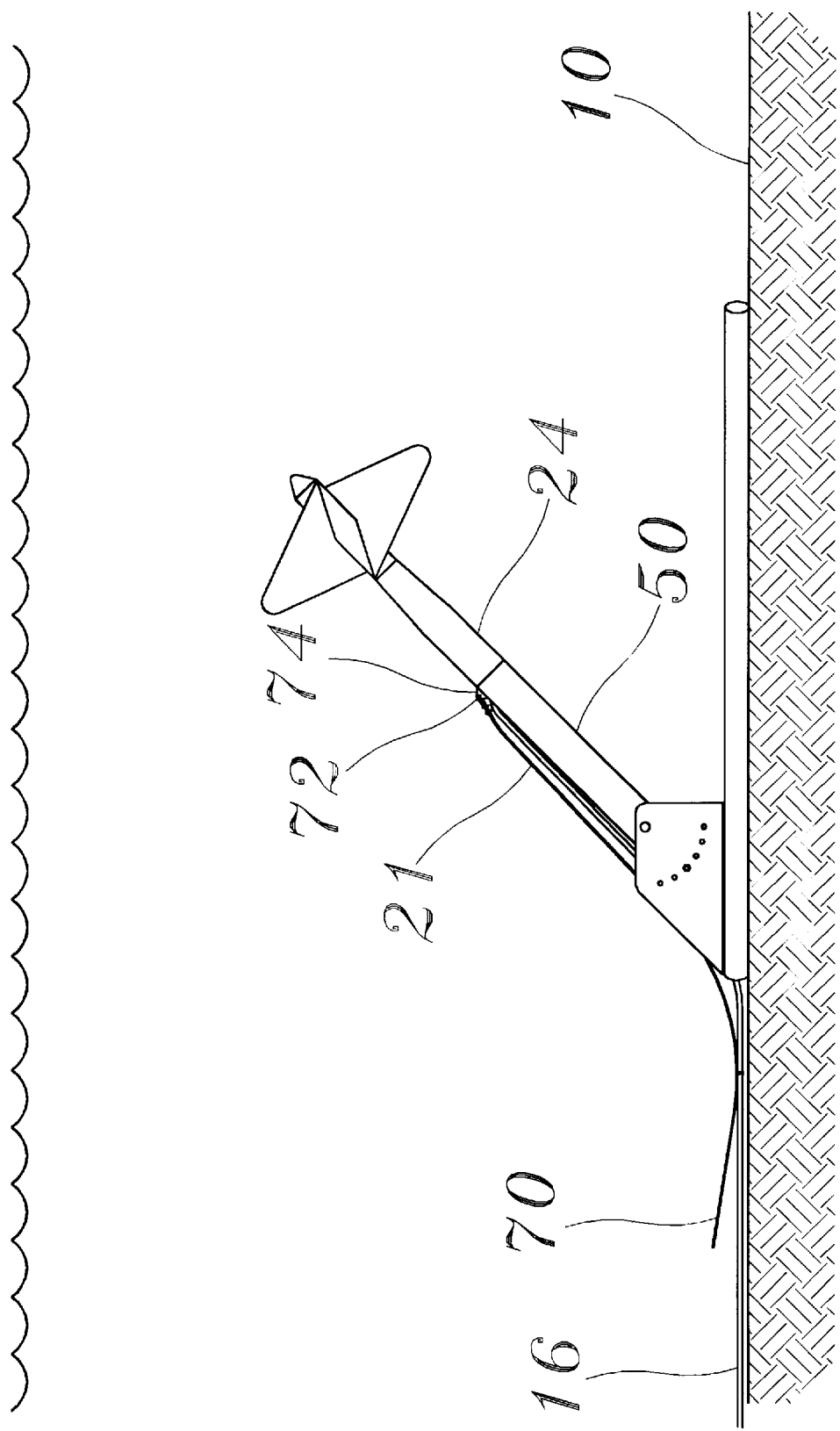
FIGS. 3b, 3c, and 3d show the sequence of steps by which the tether cable is used to retrieve the device.
Figure 3C:
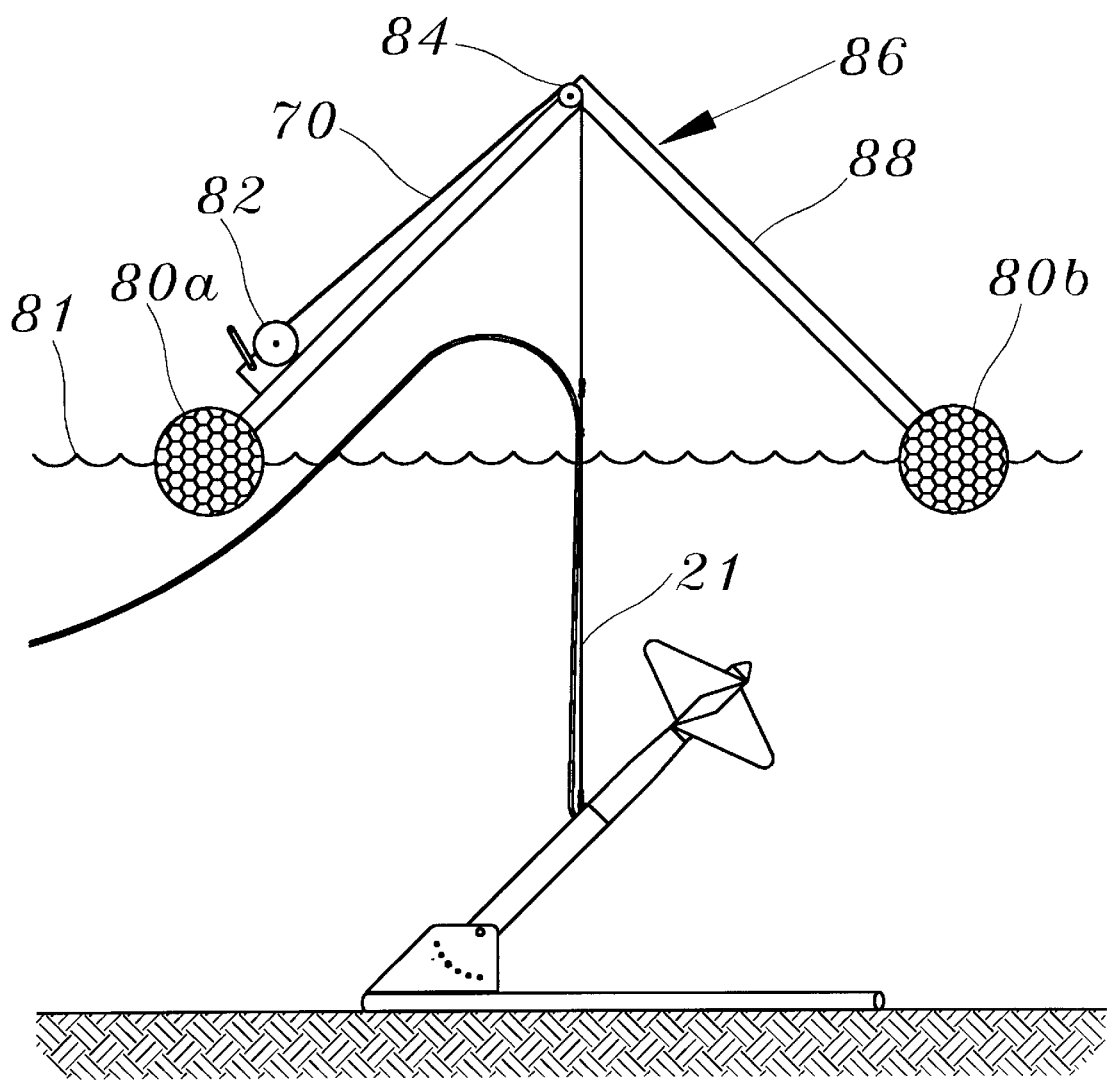
Figure 3D:
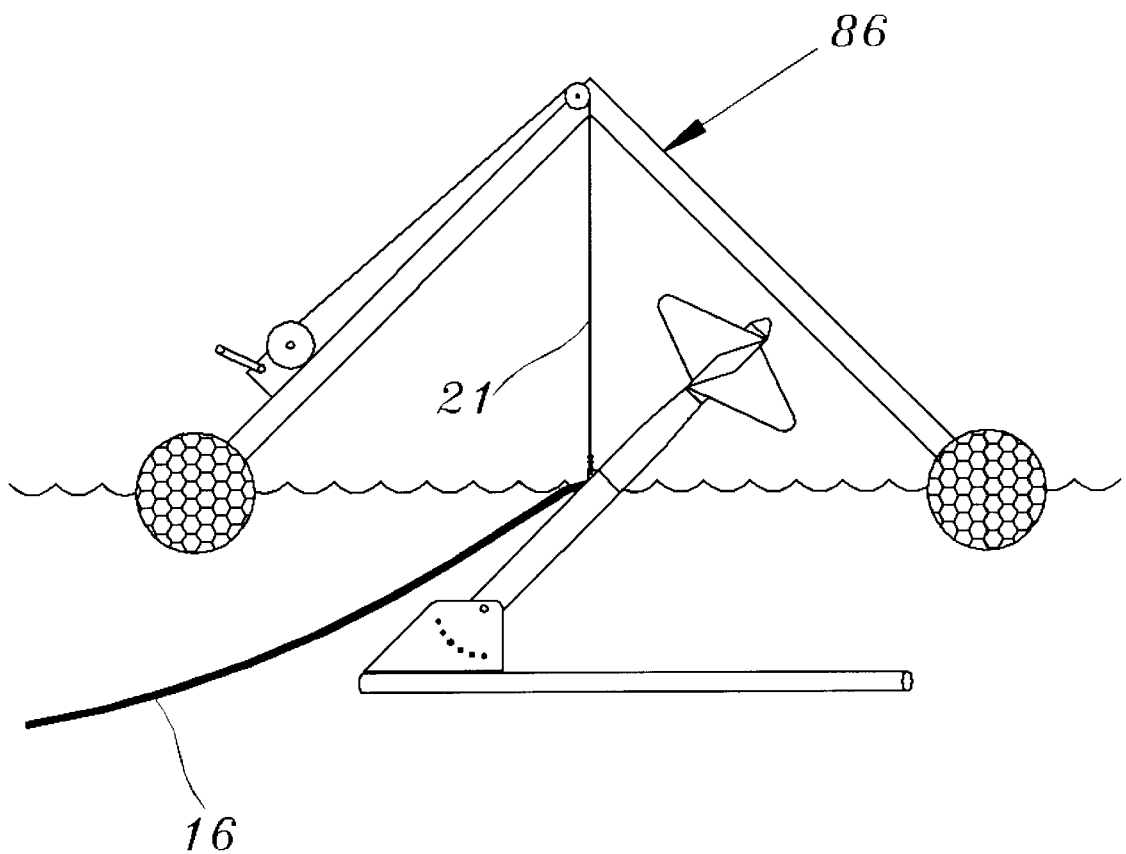

FIGS. 3b, 3c, and 3d show the sequence of steps by which the device is retrieved to the surface of the water body for servicing or relocation Installation of the device is accomplished by reversing the steps of FIGS. 3c and 3d.

FIG. 3b shows the device in the normal operating position at rest on the bottom of the water body 10. Tethering cable 21 is connected at its first end by pin 52 to a lifting clevis 74 on the support bar 50, or, optionally to the submersible motor unit 24. Tethering cable 21 is detachably connected near its second end 70 to electrical power cord 16, the purpose of which is to enable location and retrieval of tether cable 21 by progressively raising electrical power cord 16, beginning near the first end at the point of entry into the water body, and continuing, from a slow moving boat, until the second end 70 of tether cable 21 is retrieved.

FIG. 3c shows the attachment of tether cable 21 to a floating retrieval barge 86, floating on water body surface 81. The floating retrieval barge embodiment shown consists of pontoons 80a and 80b, support frame 88, pulley 84, and winch 82. The second end 70 of tether cable 21 has been connected to winch 82, and is ready for raising.

FIG. 3d shows the device in a partially raised position during retrieval. Tether cable 21 has been detached from electric power cable 16. Electric power cable 16 can optionally be unplugged or disconnected from the device prior to moving floating retrieval barge 86.

Figure 4:
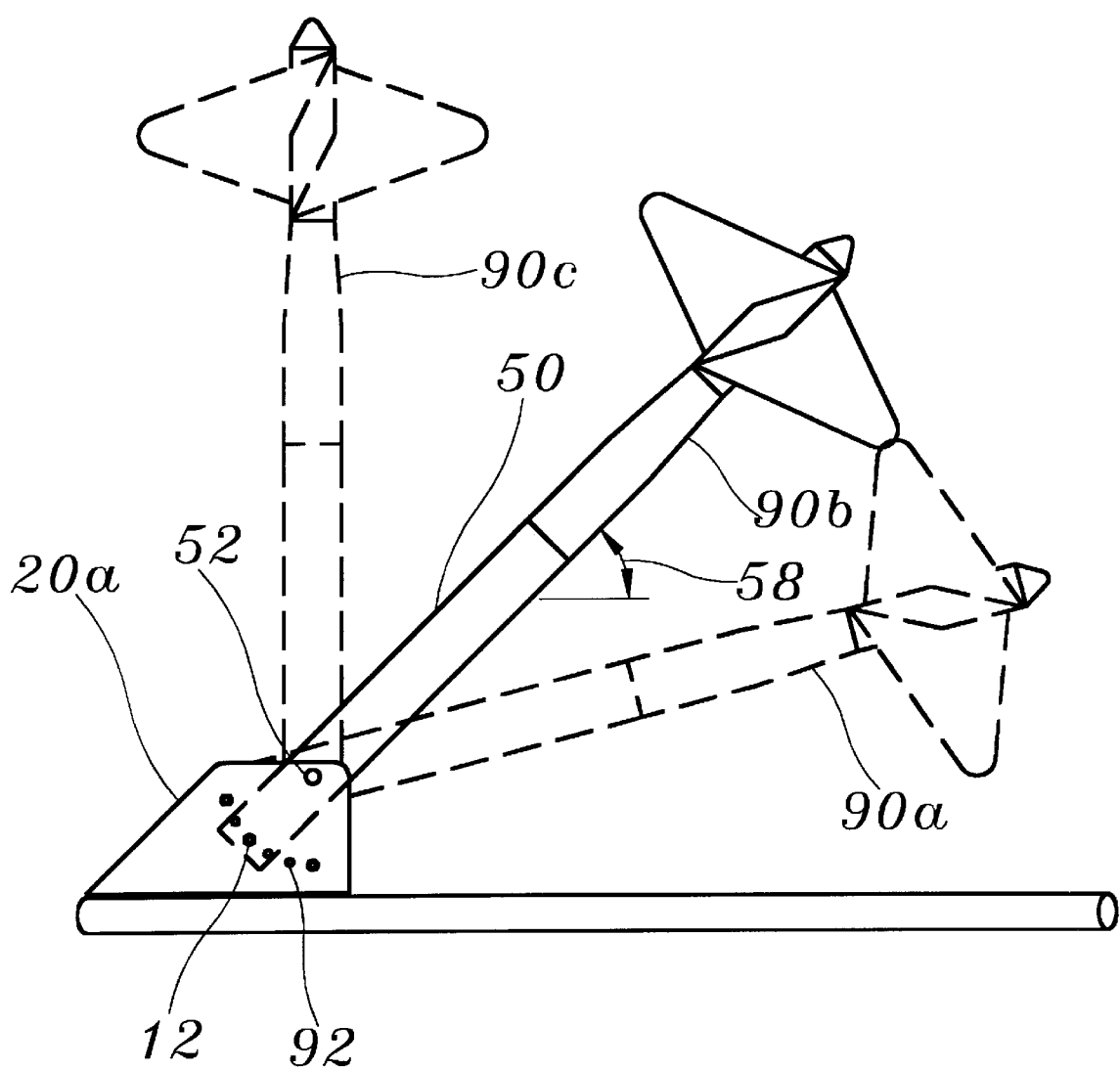
FIG. 4 depicts the mechanism for adjusting and locking the elevation angle.

FIG. 4 illustrates the means by which elevation angle 58 is adjusted. FIG. 4 also shows an intermediate elevation position 90b, as well as two alternate positions 90a and 90c. Mounting plates 20a and 20b each include a central hole to support opposite ends of pivot pin 52. Mounting plates 20a and 20b also each include a plurality of holes 92 arranged along an arc shaped path centered at the pivot pin 52, the purpose of which is to accept locking bolt 12 in one of several alternate positions. Support bar 50 is inclined to one of the several alternate elevation angle settings 90a, 90b, and 90c on pivot pin 52, then locking bolt 12 is positioned in the corresponding holes in mounting plates 20a and 20b to constrain support bar 50 at the desired elevation angle setting.

Figure 5:
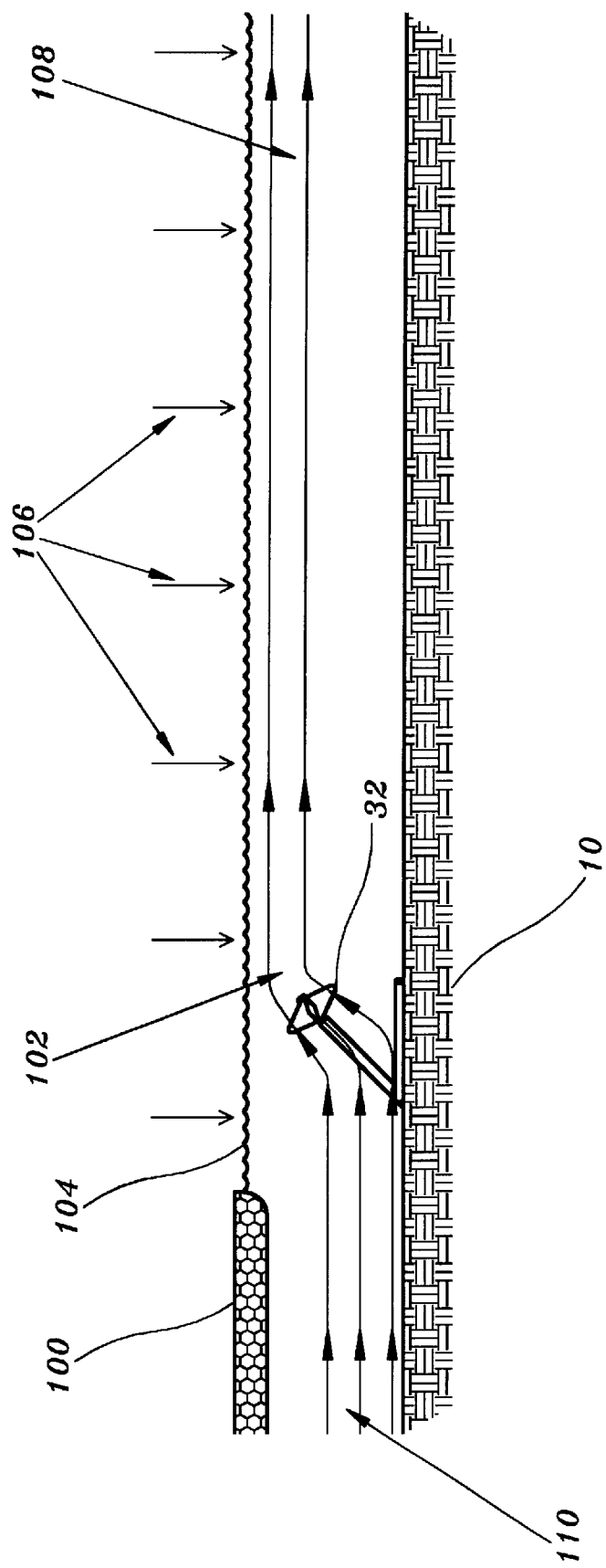
FIG. 5 illustrates use of the invention for prevention of winter kill of fish in surface-frozen water bodies.

FIG. 5 illustrates use of the invention for prevention of winter kill of fish in surface-frozen water bodies. The device is inclined to produce vertical and, optionally, horizontal components of flow. Prior to freezing of the water body, the device rests beneath the surface of the water body, where it is not subjected to damage by storms, wave action, navigational accidents, or vandalism. As the surface of the water body freezes, the device is not subjected to damage or movement caused by ice heaves or large floating ice masses. When additional dissolved oxygen is required, the propeller 32 is rotated to produce an upward movement of warm bottom water 110. Resulting impingement of warm water on the underside of ice cover 100 melts an opening, resulting in an area of open water surface 104 exposed directly to the atmosphere. Opening size is further increased by the horizontal movement of warm water to points remote from the device. Open water surface 104 allows direct diffusion of atmospheric oxygen 106 to oxygen-poor surface water 102, and production of oxygen through photosynthesis of algae and other submerged plants. Horizontal movement of resulting oxygen-enriched water 108 further increases dissolved oxygen levels at more distant points under the ice cover in the far wake of the device's propeller.

Figure 6:
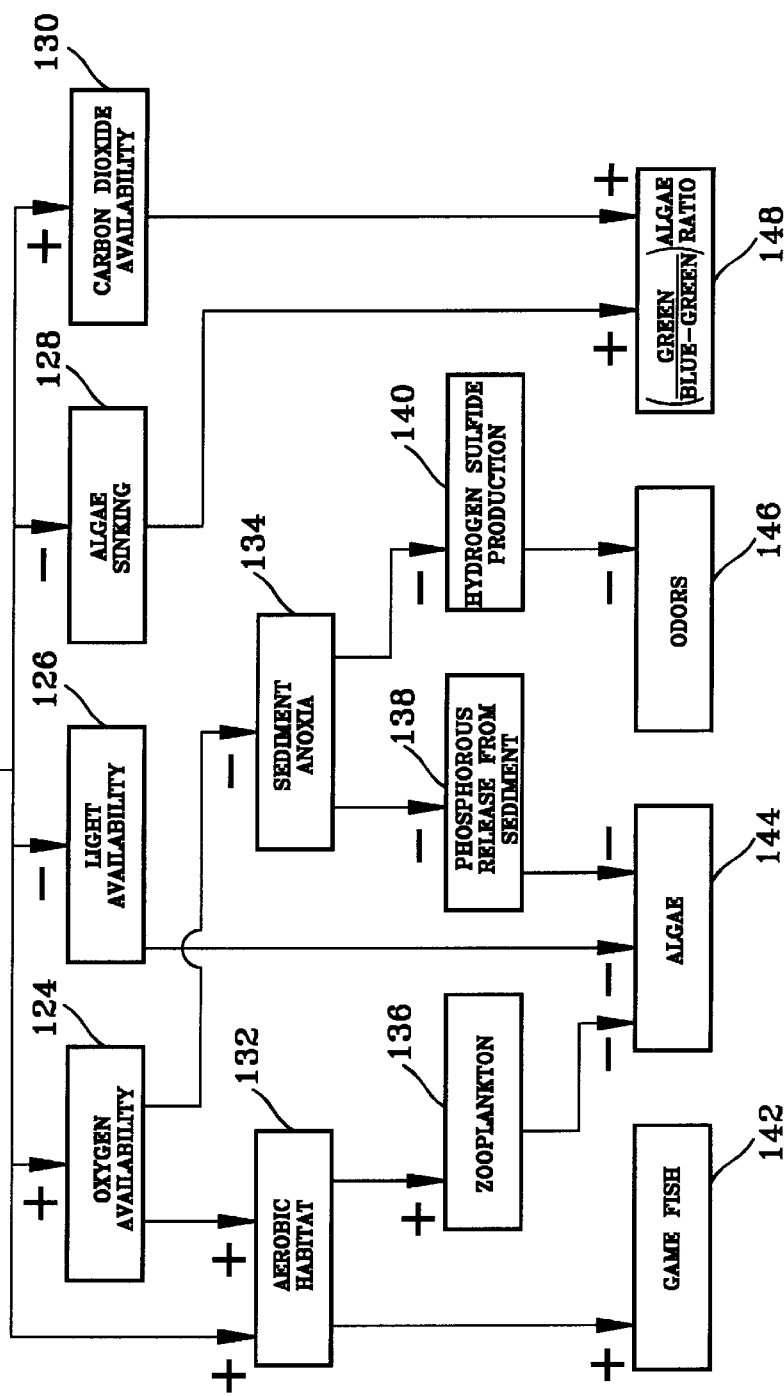
FIG. 6 is a flow chart showing the cause-and-affect relationships by which circulation improves the recreational and aesthetic qualities of a stratified water body.

FIG. 6 is a flow chart showing the cause-and-affect relationships by which circulation 120 improves several characteristics of a stratified water body through the benefits of increasing mixed depth 122. Plus (+) signs indicate an increase in the affected quantity, and minus (−) signs indicate a decrease.

Greater mixed depth 122 increases the size of aerobic habitat 132 both directly by increasing epilimnion depth, and indirectly through increased oxygen availability 124 by exposing more oxygen-poor water to surface diffusion of oxygen from the atmosphere. The increased aerobic habitat 132 size promotes larger game fish 142 populations. Increased aerobic habitat 132 also provides additional deep, dark refuge for zooplankton 136 from planktivorous fish predators. The additional zooplankton 136 graze on additional algae, reducing algae 144 populations.

Greater mixed depth 122 also reduces light availability 126. Reduced light availability 126 results in reduced photosynthesis by algae, thus less algae 144 growth. If de-stratification is complete and increased oxygen availability 124 reaches the sediment, then sediment anoxia 134 is reduced or eliminated. This, in turn, reduces phosphorous release from the sediment 138, which further reduces algae 144 populations. Reduced sediment anoxia 134 also inhibits hydrogen sulfide production 140, resulting in less undesirable odors 146.

Increased mixed depth 122 reduces the sinking of algae 128, particularly less buoyant species such as green algae (Chlorophyta). This gives green algae a competitive advantage over the less desirable blue-greens (Cyanobacteria), increasing the (green/blue-green) algae ratio 148.

Increasing mixed depth 122 can also bring additional carbon dioxide up from the deeper waters, increasing carbon dioxide availability 130 for photosynthesis. This increased carbon dioxide availability 130 gives green algae a further competitive advantage over the less desirable blue-greens (Cyanobacteria), increasing the (green/blue-green) algae ratio 148.

There are many possible variations to the invention within the scope of the claims, as will be apparent to those skilled in the art. The descriptions are given only as examples of how the invention may be used. They should not be considered to limit the invention.

I claim:

1. A totally submerged device for circulating a water body whereby an open substantially axial flow impeller, supported and driven by a submersible electric motor unit, supported by a base resting on the bottom of the water body, connected through an electric power cord to an on-shore electric power source, retrievable to the surface for inspection, repairs, cleaning, or other maintenance, by a means not normally protruding through the surface of the water body, said retrieval means attached directly to the electric power cord, resting on the bottom of the water body, such that said retrieval means can be located and retrieved to the surface by raising the electric power cord progressively from its point of entry into the surface of the water body, produces a water movement directed as aimed to produce the desired effect.

2. The apparatus of claim 1 wherein a speed reducer enables operation of the impeller at a slower speed than the motor.

3. The apparatus of claim 1 wherein a sealed enclosure protects the motor and/or other components from penetration by the surrounding water.

4. The apparatus of claim 1 wherein an enclosure is filled with a desirable fluid, such as biodegradable oil, to facilitate cooling and/or occupy space to prevent penetration of water in the event of a leak.

5. The apparatus of claim 1 wherein the device, and electrical power cords and any other appurtenances, are stream-lined to eliminate surface projections or irregularities, thus preventing snagging of weeds and other debris or foreign materials that may impede the efficient operation of the device.

6. The apparatus of claim 1 wherein the motor and impeller are connected to the base through a pivot, such that an altitude angle of the impeller's axis is adjustable between horizontal and vertical.

7. Method, using the apparatus of claim 1, for prevention of winter kill of fish due to suffocation in a water body with surface ice cover and resulting in dissolved oxygen depletion, comprising the steps of: (1) placing the device on the bottom of said water body with impeller axis directed at least in part vertically; (2) rotating the impeller to induce an upward flow of warmer, denser water from the bottom, such that said warmer, denser water causes melting of an opening in said surface ice cover.

8. Method, using the apparatus of claim 1, for artificial circulation of nonfrozen water bodies for horizontal mixing and/or de-stratification, comprising the steps of: (1) placing the device on the bottom of said water body, with impeller axis aimed in a defined direction; (2) rotating the impeller to induce a water current to circulate said water body.

9. Method, using the apparatus of claim 1, for distribution of treatment agents through mixing and circulation, comprising the steps of: (1) placing the device on the bottom of said water body, with impeller axis in a defined direction; (2) rotating the impeller to induce a water current to circulate said water body; (3) introducing treatment agents into said water current such that said treatment agents shall be dissolved and/or suspended into said water body, and shall be distributed to portions of said water body remote from the location where said treatment agents were introduced.

10. Method of claim 9, wherein said treatment agents shall be precipitating agents to facilitate removal of phosphorous from said water body.

* * * * *